United States Patent
Ahmad et al.

(10) Patent No.: US 11,785,082 B2
(45) Date of Patent: Oct. 10, 2023

(54) DOMAIN REPLICATION ACROSS REGIONS

(71) Applicant: Oracle International Corporation, Redwood Shores, CA (US)

(72) Inventors: Arsalan Ahmad, Redmond, WA (US); Pradyumna Reddy Vajja, Bellevue, WA (US); Ashwin Kumar Vajantri, Seattle, WA (US); Nikhil Yograj Vaishnavi, Fremont, CA (US); Girish Yashawant Mande, San Jose, CA (US); Girish Nagaraja, Sammamish, WA (US); Gregg Alan Wilson, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/832,283

(22) Filed: Jun. 3, 2022

(65) Prior Publication Data
US 2023/0101337 A1 Mar. 30, 2023

Related U.S. Application Data

(60) Provisional application No. 63/250,652, filed on Sep. 30, 2021.

(51) Int. Cl.
*H04L 67/1095* (2022.01)
*G06F 9/54* (2006.01)

(52) U.S. Cl.
CPC .......... *H04L 67/1095* (2013.01); *G06F 9/547* (2013.01)

(58) Field of Classification Search
None
See application file for complete search history.

(56) References Cited

U.S. PATENT DOCUMENTS 7,865,306 B2 * 1/2011 Mays ................. G06Q 30/0266
                                                      348/148
8,930,493 B2   1/2015 Inoue et al.
(Continued)

FOREIGN PATENT DOCUMENTS

CN    108322471 B1    4/2019
CN    108337260 B4    4/2019
(Continued)

OTHER PUBLICATIONS

Kaippallimalil et al., "Data distribution and synchronization in next generation mobile core network", Oct. 1, 2015, IEEE, 2015 IEEE Conference on Standards for Communications and Networking (CSCN) (pp. 288-293) (Year: 2015).*
(Continued)

*Primary Examiner* — Davoud A Zand
(74) *Attorney, Agent, or Firm* — Kilpatrick Townsend & Stockton LLP

(57) ABSTRACT

The present embodiments relate to a CI replication service that can replicate domain data from IDCS control plane to data plane and to all subscribed regions of a domain. For instance, the CI replication service can provide replication of required resources of a domain for AuthN and AuthZ from an IDCS local region to other regions for high availability (e.g., to improve latency). The CI replication service can replicate the resources from a domain's home region to all subscribed regions for local availability of data for workloads running in those regions. Further, when a new region is subscribed for a domain, then the service can bootstrap that domain's data from home region before enabling that region for the domain.

20 Claims, 11 Drawing Sheets

(56) References Cited

U.S. PATENT DOCUMENTS

| | | | |
|---|---|---|---|
| 9,781,122 B1 | 10/2017 | Wilson et al. | |
| 9,838,376 B1 | 12/2017 | Lander et al. | |
| 9,838,377 B1 | 12/2017 | Lander et al. | |
| 9,935,975 B2 * | 4/2018 | Wilkerson | G06F 12/145 |
| 10,200,358 B2 | 2/2019 | Lander et al. | |
| 10,218,705 B2 | 2/2019 | Wilson et al. | |
| 10,255,061 B2 | 4/2019 | Lander et al. | |
| 10,261,836 B2 | 4/2019 | Bansal et al. | |
| 10,263,947 B2 | 4/2019 | Vats et al. | |
| 10,341,410 B2 | 7/2019 | Lander et al. | |
| 10,348,858 B2 | 7/2019 | Theebaprakasam et al. | |
| 10,425,386 B2 | 9/2019 | Wardell et al. | |
| 10,445,395 B2 | 10/2019 | Carru et al. | |
| 10,454,915 B2 | 10/2019 | Mohamad Abdul et al. | |
| 10,454,940 B2 | 10/2019 | Lander et al. | |
| 10,484,243 B2 | 11/2019 | Cole et al. | |
| 10,484,382 B2 | 11/2019 | Wilson et al. | |
| 10,505,941 B2 | 12/2019 | Vats et al. | |
| 10,511,589 B2 | 12/2019 | Gangawane et al. | |
| 10,516,672 B2 | 12/2019 | Gupta et al. | |
| 10,530,578 B2 | 1/2020 | Keshava et al. | |
| 10,567,364 B2 | 2/2020 | Vats et al. | |
| 10,579,367 B2 | 3/2020 | Lander et al. | |
| 10,581,820 B2 | 3/2020 | Keshava et al. | |
| 10,585,682 B2 | 3/2020 | Jain et al. | |
| 10,594,684 B2 | 3/2020 | Bansal et al. | |
| 10,616,224 B2 | 4/2020 | Subramanian et al. | |
| 10,693,861 B2 | 6/2020 | Lander et al. | |
| 10,715,564 B2 | 7/2020 | Mohamad Abdul et al. | |
| 10,721,237 B2 | 7/2020 | Vats et al. | |
| 10,735,394 B2 | 8/2020 | Gupta et al. | |
| 10,764,273 B2 | 9/2020 | Mohamad Abdul et al. | |
| 10,791,087 B2 | 9/2020 | Medam et al. | |
| 10,798,165 B2 | 10/2020 | Srinivasan et al. | |
| 10,831,789 B2 | 11/2020 | Srinivasan et al. | |
| 10,834,137 B2 | 11/2020 | Pitre et al. | |
| 10,846,390 B2 | 11/2020 | Subramanian et al. | |
| 10,848,543 B2 | 11/2020 | Lander et al. | |
| 10,878,079 B2 | 12/2020 | Vepa et al. | |
| 10,904,074 B2 | 1/2021 | Wilson et al. | |
| 10,931,656 B2 | 2/2021 | Carru et al. | |
| 11,023,555 B2 | 6/2021 | Carru et al. | |
| 11,061,929 B2 | 7/2021 | Xu et al. | |
| 11,088,993 B2 | 8/2021 | Wardell et al. | |
| 11,165,634 B2 | 11/2021 | Medam et al. | |
| 11,308,132 B2 | 4/2022 | Srinivasan et al. | |
| 11,321,343 B2 | 5/2022 | Srinivasan et al. | |
| 2021/0342785 A1 * | 11/2021 | Mann | G06F 11/3409 |

FOREIGN PATENT DOCUMENTS

| | | |
|---|---|---|
| CN | 108322472 B2 | 6/2019 |
| CN | 107852417 B4 | 4/2021 |
| CN | 109639687 B2 | 5/2021 |
| CN | 109565505 B2 | 6/2021 |
| CN | 109314704 B1 | 7/2021 |
| DE | 102017003243 B4 | 10/2018 |
| EP | 3311548 B1 | 4/2019 |
| EP | 3361702 B2 | 10/2019 |
| EP | 3528454 B1 | 8/2020 |
| EP | 3494683 B1 | 11/2020 |
| EP | 3577885 B2 | 5/2021 |
| EP | 3361700 B4 | 8/2021 |
| EP | 3361701 B2 | 9/2021 |
| JP | 6491381 B2 | 3/2019 |
| JP | 6491774 B2 | 3/2019 |
| JP | 6491796 B2 | 3/2019 |
| JP | 6917331 B1 | 7/2021 |
| KR | 101871902 B1 | 6/2018 |
| KR | 101873941 B1 | 7/2018 |
| KR | 101874384 B1 | 7/2018 |
| KR | 102041941 B2 | 11/2019 |

OTHER PUBLICATIONS

Amazon Machine Images (AMI), Available online at: https://docs.aws.amazon.com/AWSEC2/latest/UserGuide/AMIs.html, Accessed from Internet on Sep. 23, 2021, pp. 1-3.

Azure AD Domain Services Documentation, Available online at: https://docs.microsoft.com/en-us/azure/active-directory-domain-services/, Accessed from Internet on Sep. 23, 2021, pp. 1-3.

Cloud Run: Real World Experience with Custom Domains and Issue with Latency, Available online at: https://stackoverflow.com/questions/64034347/cloud-run-real-world-experience-with-custom-domains-and-issue-with-latency, Accessed from Internet on Sep. 23, 2021, pp. 1-2.

Cross Domain Data Replication, Available online at https://kumoscale.kioxia.com/en/how-it-works/features-detail/data-protection, Accessed from Internet on Sep. 23, 2021, pp. 1-6.

Cross-Region Copying, Available online at: https://docs.aws.amazon.com/AWSEC2/latest/UserGuide/CopyingAMIs.html#copy-amis-across-regions, Accessed from Internet on Sep. 23, 2021, pp. 1-6.

High Request Latency with Custom Domains When Invoking from Some Regions, Available online at: https://cloud.google.com/run/docs/issues#latency-domains, Accessed from Internet on Sep. 23, 2021, pp. 1-3.

Optimizing the Replica Topology, Chapter 4, Available online at: https://access.redhat.com/documentation/enus/red_hat_enterprise_linux/8/html/tuning_performance_in_identity_management/optimizing-the-replica-topology_tuning-performance-in-idm, Accessed from Internet on Sep. 23, 2021, pp. 1-4.

Program Against your Datacenter Like It's a Single Pool of Resources, Available online at: http://mesos.apache.org/, Accessed from Internet on Sep. 23, 2021, 1 page.

Regions and Fault Domains, Available online at https://mesos.apache.org/documentation/latest/fault-domains/, Accessed from Internet on Sep. 23, 2021, pp. 1-2.

Regions and Zones, Available online at: https://docs.aws.amazon.com/AWSEC2/latest/UserGuide/using-regions-availability-zones.html, Accessed from Internet on Sep. 23, 2021, pp. 1-14.

Replica Sets Concepts and Features for Azure Active Directory Domain Services, Available online at: https://docs.microsoft.com/en-us/azure/active-directory-domain-services/concepts-replica-sets, Mar. 30, 2021, pp. 1-5.

Supported Cloud Regions, Available online at: https://docs.snowflake.com/en/user-guide/intro-regions.html, Accessed from Internet on Sep. 23, 2021, pp. 1-8.

Understanding Active Directory, Part IV, Available online at https://www.informit.com/articles/article.aspx?p=26961, May 24, 2002, pp. 1-3.

* cited by examiner

DOMAIN REPLICATION ACROSS REGIONS

CROSS-REFERENCE TO RELATED APPLICATIONS

The present application claims the benefit and priority under 35 U.S.C. 119(e) of U.S. Application No. 63/250,652, filed Sep. 30, 2021, entitled "DOMAIN REPLICATION ACROSS REGIONS," the content of which is herein incorporated by reference in its entirety for all purposes.

BACKGROUND OF THE INVENTION

A cloud service provider (CSP) can provide multiple cloud services to subscribing customers. These services are provided under different models including a Software-as-a-Service (SaaS), Platform-as-a-Service (PaaS), an Infrastructure-as-a-Service (IaaS) model, and others.

In the cloud environment, an identity management system is generally provided by the CSP to control user access to resources provided or used by a cloud service. Typical services or functions provided by an identity management system include, without restriction, single-sign on capabilities for users, authentication and authorization services, and other identity-based services.

The resources that are protected by an identity management system can be of different types such as compute instances, block storage volumes, virtual cloud networks (VCNs), subnets, route tables, various callable Application Programming Interfaces (APIs), internal or legacy applications, and the like. These resources include resources in the cloud and/or customer on-premise resources. Each resource is typically identified by a unique identifier (e.g., Cloud ID or CID) that is assigned to the resource when the resource is created.

An entity can provide two separate and independent identity management systems for their cloud offerings. A Cloud Infrastructure Identity and Access Management (CI-IAM or just IAM) is provided for controlling access to cloud resources for IaaS applications and services. Separately, an Identity Cloud Services (IDCS) platform is provided for security and identity management for SaaS and PaaS services. As a result of these two separate platforms, if a customer subscribes to both a SaaS or PaaS service and an IaaS service, the customer currently needs to have two separate accounts—one account with IAM for the IaaS subscription and a separate account with IDCS for the PaaS/SaaS subscription. Each account will have its own credentials, such as user login, password, etc. The same customer thus may need to have two separate sets of credentials. This can result in an unsatisfactory customer experience. Additionally, having two separate identity management system also can create obstacles for interactions between SaaS/PaaS and IaaS services.

BRIEF SUMMARY OF THE INVENTION

The present embodiments provide a cloud infrastructure (CI) replication service that can replicate domain data from an identity cloud service (IDCS) control plane to a corresponding data plane and to all subscribed regions of a domain. For instance, the CI replication service can provide replication of computing resources of a domain for AuthN and AuthZ from an IDCS local region to other regions for high availability (e.g., to improve latency). For example, the CI replication service can replicate the resources from a domain's home region to all subscribed regions for local availability of data for workloads running in those regions. Further, when a new region is subscribed for a domain, then the service can bootstrap that domain's data from home region before enabling that region for the domain.

The IDCS can generate replication logs for all resources that need to be replicated to data plane or subscribed regions. A new IDCS API can be developed for CI replication service to pull the replication logs from IDCS. The CI replication service can transport changes from the home region to each subscribed region.

In some examples, techniques (e.g., a method, non-transitory computer readable medium, and/or a system) can include obtaining, at a multi-region replication service, domain replication data for replicating a domain from a first identity cloud service computing instance in a first region, the first region comprising both the first identity cloud service computing instance and an identity and access management computing instance. The techniques can also include identifying, by the multi-region replication service, a second region with a second identity cloud service computing instance that subscribes to the domain, the second identity cloud service computing instance maintaining a replica domain shard replicating the domain. Additionally, the techniques can include forwarding, by the multi-region replication service, the domain replication data to the second identity cloud service computing instance at the second region, wherein the second identity cloud service computing instance replicates the domain using the domain replication data, and wherein the domain replication data is forwarded from the first identity cloud service computing instance to an identity shard service at the first region. Additionally, the domain replication data may be obtained from the first region via a first replication shard mapped to the domain. In some examples, the domain replication data may be forwarded from the first identity cloud service computing instance to an identity shard service at the first region and/or the domain replication data may be stored at a domain cache shard mapping to the domain at the identity shard service.

In some instances, the techniques may also include retrieving, by the multi-region replication service from the first identity cloud service computing instance via a replication log application programming interface (API), a replication log for the domain, the replication log logging instances of transmission of domain replication data from the domain to domains subscribing to the domain. The techniques may also include retrieving, by the multi-region replication service from the first identity cloud service computing instance via the replication log API, a domain subscription map for the first identity cloud service computing instance, wherein the second region with the second identity cloud service computing instance is identified as subscribing to the domain by inspecting the domain subscription map. The techniques may also include identifying, by the multi-region replication service, a request to add a third identity cloud service computing instance to subscribe to the domain, copying, by the multi-region replication service, the domain replication data for the domain to a catchup outbox at the multi-region replication service for the third region, and/or forwarding, by the multi-region replication service, the domain replication data from the catchup outbox to an inbox at the multi-region replication service for the third region, wherein the domain replication data is forwarded from the inbox to the third identity cloud service computing instance to replicate the domain. Further, in some examples, the domain replication data is obtained at an outbox buffer of the multi-region replication service and forwarded from the outbox buffer to an outbox and to an inbox specific to the second identity cloud service computing instance.

DETAILED DESCRIPTION OF THE INVENTION

Figure 1:
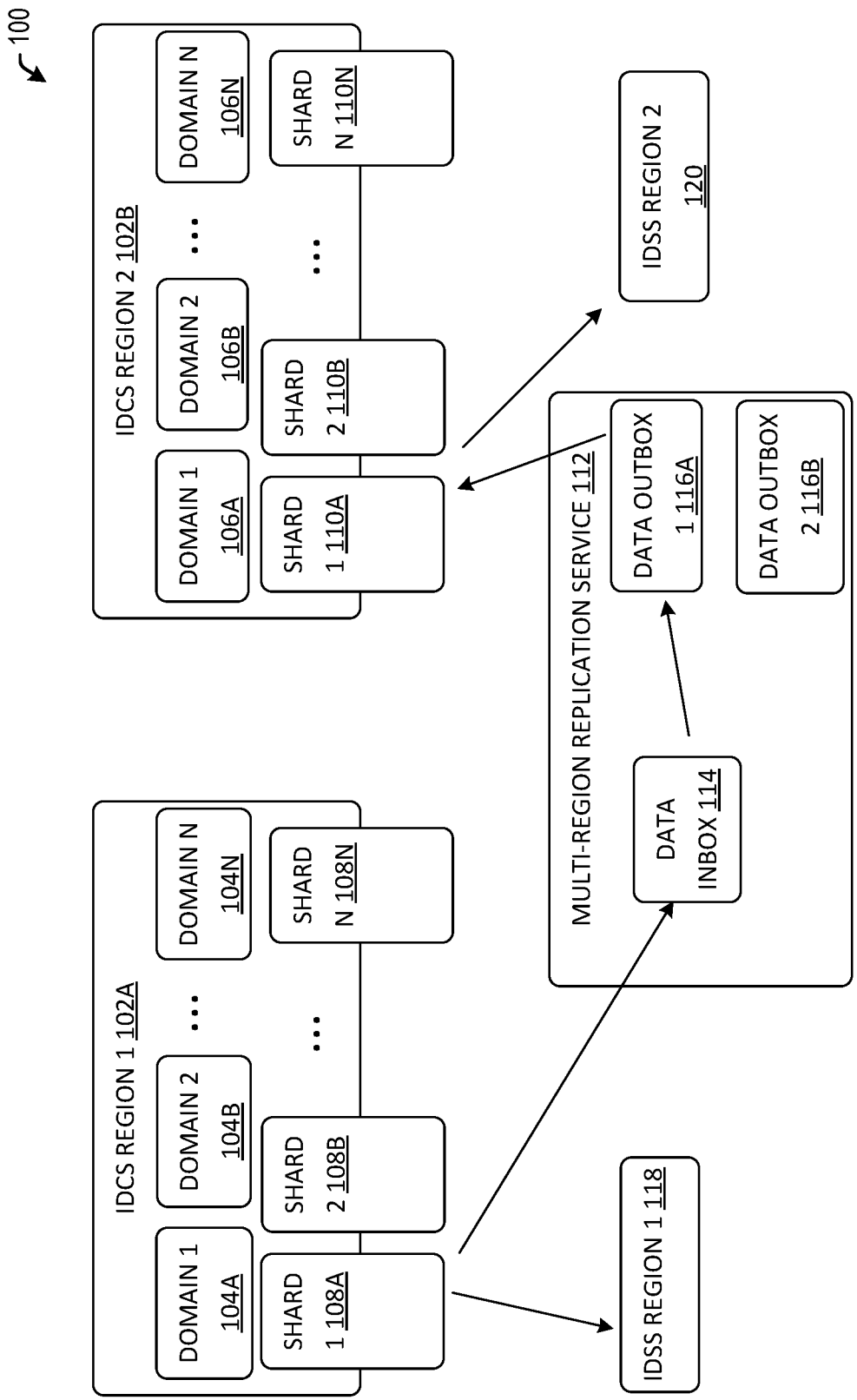
FIG. 1 is a block diagram illustrating an example system including multiple IDCS regions and a multi-region replication system, according to at least one embodiment.

A cloud infrastructure service can provide various services to a number of clients. For instance, an identity and access management (IAM) service can allow for clients to manage and automate user identities, providing secure access to client resources and assets on the cloud infrastructure service.

The cloud infrastructure service can further manage client keys and secure client data. For instance, an identity cloud service (IDCS) can include an identity as a service solution that expands client controls by expanding account provisioning/de-provisioning. The IDCS can be built on a micro service, multi-tenant architecture involving services and exposing RESTful service endpoints.

An integrated identity management platform can be implemented that integrates the IAM and IDCS platforms in a manner that is transparent to the user or customer of the cloud services while retaining and offering the various features and functionalities offered by the IAM and IDCS platforms. The integration can provide a more seamless and enhanced user experience.

However, this integration is technically very difficult because the IAM and IDCS use different procedures and protocols for implementing the identity-related functions. IAM is an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that don't have "approved" characteristics as defined by an organization's security policies. On the other hand IDCS is a role-based access control (RBAC) system which is a policy-neutral access-control mechanism defined around roles and privileges. The components of RBAC such as role-permissions, user-role and role-role relationships make it simple to perform user assignments. As yet another example, authentication and authorization frameworks or workflows (e.g., types of tokens that are used, different authentication frameworks such as OAUTH, etc.) used by the two platforms are different. Accordingly, providing an integrated solution is technically very difficult.

Further, a cloud infrastructure (CI) can include various regions set up across the globe, and each region may include an instance of IDCS. A region can have regional control plane endpoints that include an IAM control plane and an IDCS instance with SCIM stripe endpoints.

For each domain, there can include a home (e.g., local) region, where all writes go for an IDCS control plane. Prior to unifying the CI accounts, IDCS stripes were region-specific, in that each stripe was limited to that particular local region. However, being local to a particular region means that any modifications to domains may be required to be performed at the local region. For example, to modify identification data for a specific domain at a local region, all requests may need to be forwarded to the local region. However, requiring such requests to be directed to a specific region can create an unacceptable latency for customers and is difficult to scale as more domains are added to the new unified system.

The present embodiments provide a CI replication service that can replicate domain data from IDCS control plane to data plane and to all subscribed regions of a domain. For instance, the CI replication service can provide replication of required resources of a domain for AuthN and AuthZ from an IDCS local region to other regions for high availability (e.g., to improve latency). For example, the CI replication service can replicate the resources from a domain's home region to all subscribed regions for local availability of data for workloads running in those regions. Further, when a new region is subscribed for a domain, then the service can bootstrap that domain's data from home region before enabling that region for the domain.

The IDCS can generate replication logs for all resources that need to be replicated to data plane or subscribed regions. A new IDCS API can be developed for CI replication service to pull the replication logs from IDCS. The CI replication service can transport changes from the home region to each subscribed region.

The CI replication service can also support various IDCS replication scenarios. A new CI replication API can be developed for IDCS to pull the replication logs from inboxes of subscribing regions. CI replication service can horizontally scale to accommodate a large number of IDCS replication logs by adding more replication hosts and pluggable databases (PDBs), e.g., a key value data store such as Oracle's Kiev. CI replication service can also support copying data from multiple replication shards in different IDCS sub-regions having the same replication shard ID to a single replication buffer.

A. System Overview

As described herein, a multi-region replication service can implement domain replication across multiple regions. FIG. 1 is a block diagram illustrating an example system 100 for domain replication across regions. As shown in FIG. 1, the system 100 can include multiple identity cloud service (IDCS) regions (e.g., IDCS region 1 102A, IDCS region 2 102B) and a multi-region replication system 112. While two regions (e.g., region 1, region 2) are provided in the example as illustrated in FIG. 1, any number of regions can be incorporated as described herein. Each region can include an identity shard service (IDSS) instance (e.g., 118, 120). For example, IDSS region 1 118 can include an IDSS instance at a first region. Each region can comprise a location of a cluster of computing instances (e.g., by geographic region, by datacenter). In some instances, each region can be identified using a corresponding code, such as a code specifying a region (e.g., PHX representing a Phoenix-area datacenter).

As shown in FIG. 1, each region can include a plurality of domains. For example, IDCS 1 102A can include N domains (104A-N). Each domain can include a new IAM entity representing an IDCS stripe inside the IAM entity. The domain can include metadata for each IDCS stripe.

Each IDCS region can further include multiple domain shards (e.g., shards 108A-N). Each shard 108A-N can include a replication shard relating to a portion of data within each region. Each shard 108A-N can further comprise a communication channel directing data between regions. For example, each domain 104A-N can be mapped to a shard 108A-N. Each replication shard can be associated with a replication log. Data in a replication shard and/or the replication logs can be replicated across regions using the multi-region replication system 112 as described herein.

Data in replication shards 108A-N can be provided to an identity shard service (IDSS) 118. An IDSS instance 118, 120 can be disposed at a corresponding region (e.g., IDSS region 1 118 being disposed at a first region). An IDSS instance can include a Tier0 service to locally host user and client information in an IDCS instance for access by through a REST application programming interface (API). The IDCS instances 102A-B can generate sharded replication log(s) that IDSS instances (e.g., 118, 120) can access via the API for backfill. The IDSS instances 118, 120 can further includes shards of data allowing for decoupling of replication shards. The replication shards can map to corresponding shards in the IDSS. The IDSS shards can enable IDSS to backup snapshots of data independent of replication. The IDSS shards can also be referred to as data plane cache shards.

The system 100 can further include a multi-region replication service 112. A multi-region replication service 112 can implement replication of domains across regions as described herein. For instance, multi-region replication service 112 can obtain domain data from a first shard 108A at a data inbox 114, direct the data to a corresponding outbox 1126A, and forward the domain data to a shard 110A in an IDCS instance in a second region 102B.

The data inbox 114 can include a data bucket that receives domain data a shard in a first region. The data inbox 114 can include a buffer comprising a data bucket that maintains a local copy of replication shards for replicating data to region outboxes. Each outbox 116A-B can be specific to a region and can comprise a data bucket for each service instance.

The multi-region replication service 112 can obtain replication data from a first replication shard (e.g., 108A) for replicating the domain on a subscribing region (e.g., domain 1 106A at IDCS region 2 102B). For instance, the multi-region replication service 112 can copy the replication logs to an outbox buffer 116A and transport the replication logs to subscribed regions (e.g., 102B). The replication data can be provided to subscribing regions via a backfill process as described herein. IDCS instance 102A can generate the replication logs for all resources that need to be replicated to data plane (e.g., IDSS region 1 118) or subscribed regions (IDCS region 2 102B). A new IDCS API can be implemented at the multi-region replication service 112 to pull the replication logs from the IDCS instance 102A. This API can additionally be used in data plane backfill process.

For example, a first region 102A can be subscribed to a second region 102B. The domain data at the first region 102A can be replicated across regions to the subscribing region. For instance, domain 1 104A can be mapped to a first shard 108A. The shard 108A can direct the replication data to the multi-region replication service. Domain data from the IDCS control plane (e.g., at IDCS region 1 102A) to a data plane (e.g., IDSS region 1 118) and to all subscribed regions of a domain (IDCS region 2 102B) can be replicated using the multi-region replication service 112. The multi-region replication service 112 can transport the changes from home region to inbox of each subscribed region.

The multi-region replication service 112 can support various IDCS scenarios. For example, a new replication service can execute as an overlay, and a new replication API can be implemented to pull replication logs from an inbox (e.g., 114). The multi-region replication service 112 can accommodate a large number of IDCS replication logs by adding more replication hosts and databases. The multi-region replication service 112 can support copying replication data from multiple replication shards in different IDCS sub-regions having a same replication shard ID to a single replication buffer.

Further, the system 100 as described herein can implement a data plane backfill process. The data plane backfill process can pull the replication logs from IDCS control plane and ingest the changes after data transformation. IDCS backfill process can pull the replication logs from inbox and ingest the changes in control plane. A stripe API can support stripe creation in a subscribed region as part of a region subscription workflow. A domains snapshot can be created for the first time to build data plane cache shards. On-demand snapshots can further be created whenever a domain is subscribed in another region to bootstrap the domain in subscribed region.

Figure 2:
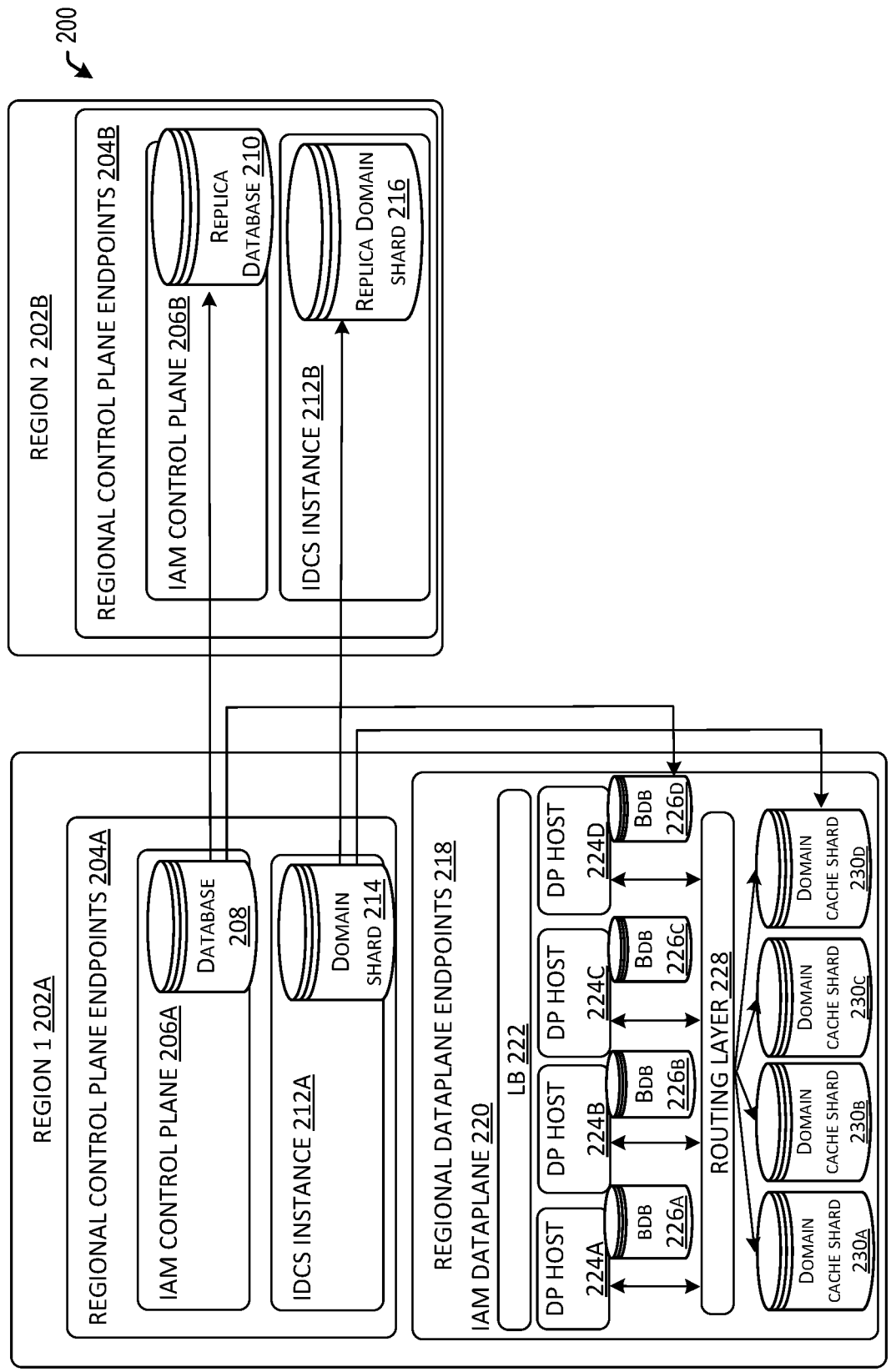
FIG. 2 is a block diagram illustrating an example system for replicating data across regions, according to at least one embodiment.

FIG. 2 is a block diagram illustrating an example system for replicating data across regions. As shown in FIG. 2, multiple regions (e.g., regions 1 202A, region 2 202B) are provided. For example, a first region 202A can include regional control plane endpoints 204A and regional data plane endpoints 218, while a second region 202B can include regional control plane endpoints 204B.

Regional control plane endpoints 204A-B can include IAM control planes (206A-B) and IDCS instances 212A. The IAM control plane (e.g., 206A-B) can include one or more databases (e.g., database 208). Each IDCS instance 212A-B can include one or more domain shards. Each IDCS instance 212A-B can use the same replication shard IDs (e.g. IDCS1, IDCS2, to IDCS100). For instance, the maximum size of replication shard can include eight characters. The replication shard ID can be used to create a corresponding buffer, outbox buckets, and inbox buckets in a CI replication key value store database.

The replication shards in multiple IDCS instances within a CI region that share the same replication shard Id can be mapped to the single buffer in the CI replication service. The IDCS CP backfill service in each IDCS instance 212A-B in a CI region can read data from all the replication inboxes in that region, copy domain events for domains which are present in that instance, and ignore the events for domains which are not present in that IDCS instance.

The CI replication service can create replication channels (buffers, outboxes, inboxes) for the replication shards in multiple Kiev PDBs. The IDSS can also read all the replication shards in a region.

As noted above, the system can also include regional data plane endpoints 218. The endpoint 218 can include an IAM data plane 220 with a load balancer 222 and multiple data plane (DP) hosts (e.g., DP hosts 224A-D). Hosts 224A-D can include one or more databases (e.g., BDB 226A-D). The hosts 224A-D can include a routing layer 228 for domain to shard mapping. The IAM data plane 220 can also include multiple domain cache shards 230A-D. The IDCS instances can replicate data across regions and replicate it to domain cache shards maintained in the IAM data plane.

In replicating domain data, data from a first region control plane endpoint 204A can be directed to control plane endpoints for another region (204B) and a regional data plane endpoints for the first region 218. The multi-region replication service as described herein can direct the cross-regional replication data as described herein. For instance, data from a database 208 in an IAM control plane 206A can be directed across regions to a replica database 210 at a IAM control plane 206B in the second region. Further, data from a database 208 in an IAM control plane 206A can be directed to the regional data plane endpoint 208 host database (e.g., 226D).

Further, replication data can be directed from a domain shard 214 at an IDCS instance 212A in a first region 202A to a replica domain shard 216 at an IDCS instance 212B at a second region 202B. Further, the replication data can be directed to a domain cache shard 230D at the region data plane endpoint 218 in the first region 202A.

Domain data for a first region can be replicated to one or more subscribing regions. For example, IDCS instance 212B at region 2 202B can subscribe to a domain at a first IDCS instance 212A at a first region 202A. Domains can be subscribed to a region via a subscription process. The subscription process can include a client, via a console, subscribing a domain to a region. The console can call an IAM control plane API to subscribe the domain to a region to execute a domain subscription workflow. The workflow can call the IDCS to generate a domain snapshot and upload it to a storage module (e.g., Casper storage module). When the snapshot is successfully uploaded, the tenancy home region can change the domain subscription status to SUBSCRIBING (snapshot uploaded). When this event gets replicated and reaches the domain home region, then an entry can be created for the domain in a domain subscription map in the home region of domain. A multi-region replication service can periodically call IAM CP to query new entries in the domain subscription map. When the multi-region replication service sees a new domain entry with status SUBSCRIBING, the multi-region replication service can download the domain snapshot and copy it to buffer. The rest of the scenario works similar to IAM tenancy subscription scenario.

Further, replication logs can be transported to subscribed regions. For instance, the multi-region replication service can pull replication logs from the IDCS instance and copy the logs to corresponding outbox buffers for each replication shard. From the outbox buffer, the logs can be copied to a target region-specific outbox table by applying a domain filter. The replication logs can then be provided to the subscribing region(s).

Figure 3:
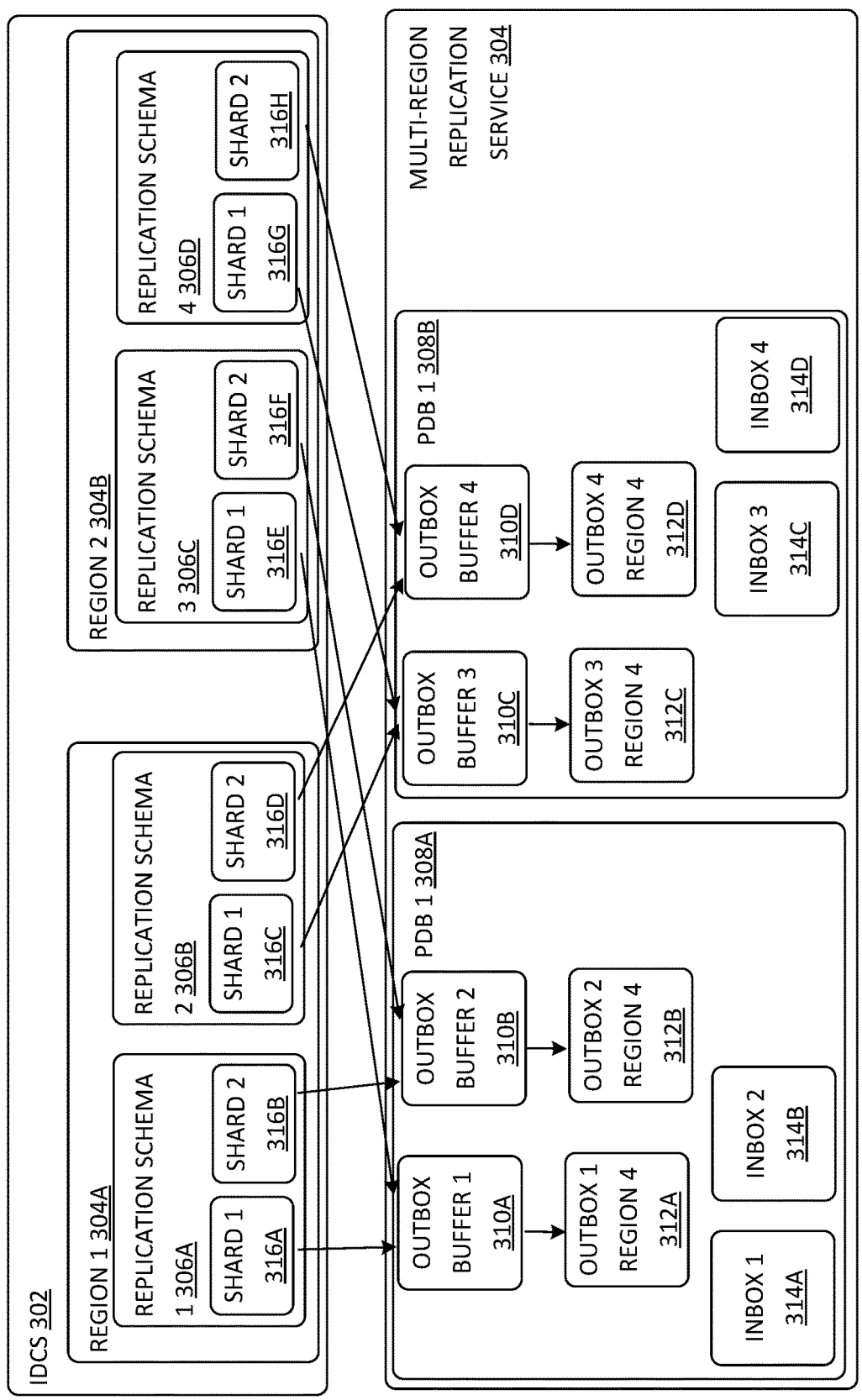
FIG. 3 is a block diagram illustrating a replication system including an IDCS and a CI replication service, according to at least one embodiment.

FIG. 3 is a block diagram 300 illustrating a replication system including an IDCS 302 and a multi-region replication service 304. The IDCS 302 can include multiple regions (e.g., region 1 304A, region 2 304B). Each region can include multiple replication schemas (e.g., replication schemas 306A-D) and one or more domain shards (e.g., domain shards 316A-H).

Shard data can be forwarded to outbox buffers 310A-D disposed in pluggable database (PDB) instances 308A-B in the multi-region replication service 304. Shard data can comprise domain replication data for domain replication across regions. The data at the buffers 310A-D can be directed to outboxes 312A-D and inboxes 314A-D. The inboxes 314A-D can store replication logs from outboxes of other regions.

Data from the domain shards can be provided to various databases (e.g., PDB 1, PDB 2) in the multi-region replication service. For instance, data from a first replication schema can be provided to corresponding outbox buffers (outbox buf1, outbox buf2). The data can be forwarded from the outbox buffers to corresponding outbox regions. The replication service can store the replication data and forward the replication data to subscribing regions via inboxes.

B. Backfill Process Overview

Figure 4:
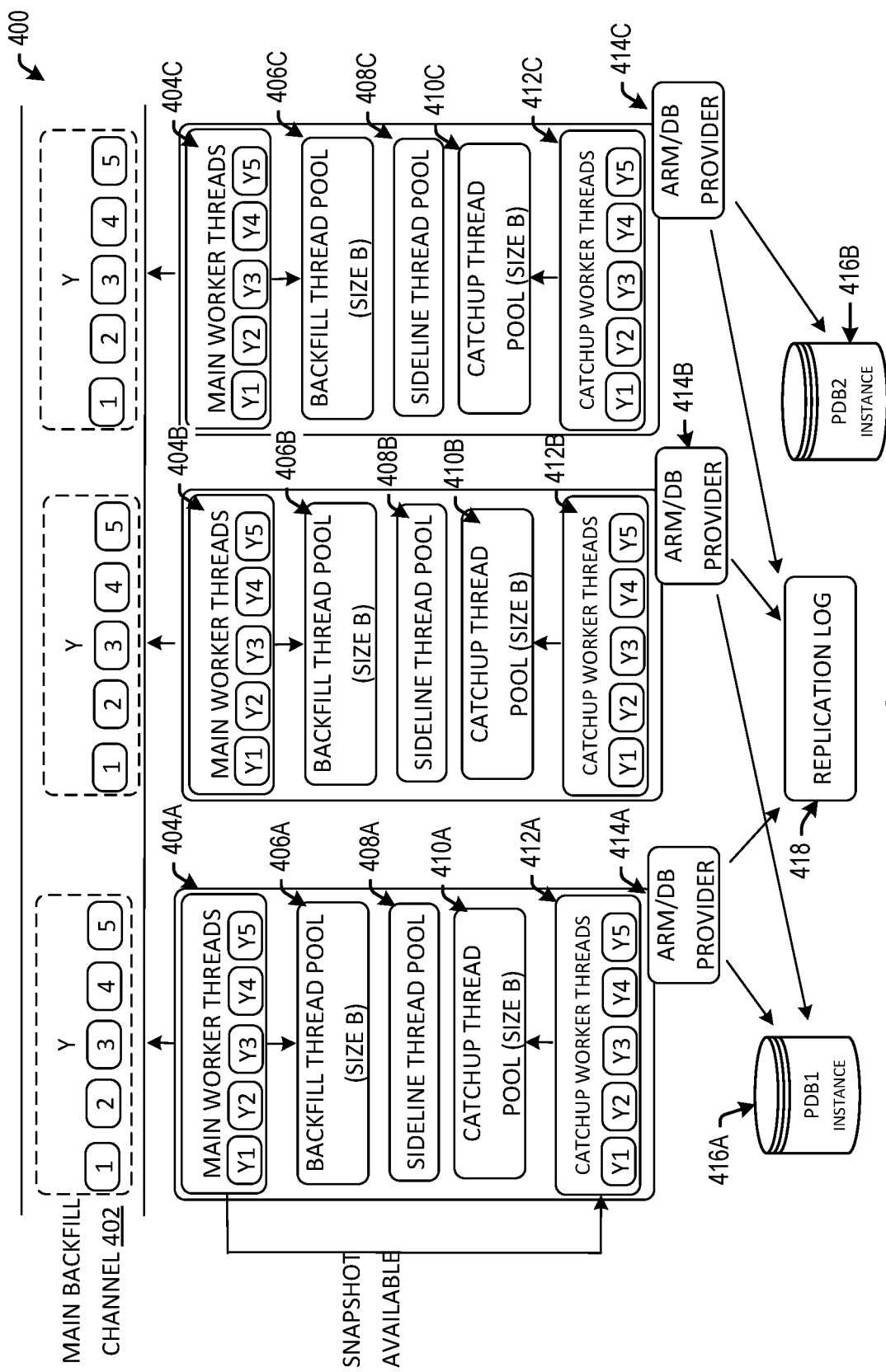
FIG. 4 is a block diagram providing an architecture for a backfill process, according to at least one embodiment.

As noted above, replication data can be provided to subscribing regions via a backfill process. An IDCS backfill process running in the replication service can make a replication API call, and pull the replication events. FIG. 4 is a block diagram 400 providing an architecture for a backfill process.

A data plane shard backfill process running on each of the sharded DP (IDSS) hosts can pull the events from replication shards mapped to that IDSS shard. Each IDSS shard host can use a replication log API provided by the IDCS CP to retrieve the logs. In regions where there are multiple IDCS instances having same replication shards, the IDSS hosts can read data from each instance for each replication shard. Replication data can be provided from a processor (e.g., a reduced instruction set computer (RISC)-type processor (e.g., ARM)) and/or database (DB) provider 414A-C to PDB instances 416A-B and/or a replication log 418.

A multi-threaded backfill process can read from N inboxes over M replication service instances, where any inbox data may not be shared between two or more replication services. Each Replication Service may include have Y worker threads (e.g., in main worker threads 404A-C) configured to be reading from Y inboxes (e.g., in main backfill channel 402). Each worker thread can read from single Inbox from the given Y inboxes at any given time.

Each worker thread (e.g., 404A-C) can provide the replication data read from Inbox to backfill thread pools 406A-C of size B. Each worker thread in the replication service can request for and read K number of records from inbox replication logs as a page size per REST API request if the lock state for the inbox is not closed. Each Thread from the backfill thread pools 406A-C can invoke a processor (e.g., ARM) process and also update a replication log table. While replicating resources in the subscribed region via replication services, each replication service can process the records returned from the input replication logs API.

The resource ID can be sidelined (e.g., via a sideline thread pool 410A-C) and any update associated with the resource ID for a domain can be ignored. A sideline table can store a resource type, a resource ID, a domain name, and a last sequence number for the domain. The side line table can have a flag to mark if the record is ready to be read and replicated in the region.

Further, catchup worker threads 412A-C can provide a dedicated worker thread pool (e.g., 410A-C) for catchup channel polling with a pool size Y. The catchup worker threads 412A-C can provide for replication upon adding a new region for subscription as described herein.

For each replication event, a change can be applied in IDCS control plane database via a processor (e.g., ARM) call which can update the cache also for cacheable resources. If the update fails, then that particular resource ID for that domain and events can be sidelined. All the sidelined event global sequence numbers can be maintained in replication metadata tables.

The backfill process can support multi-threaded backfill process which can read from N Inboxes over M replication services. Any inbox data may not be shared between two or more replication services. Further, each replication service will have Y worker threads configured to be reading from Y inboxes. Each worker thread can read from single Inbox from the given Y inboxes at any given time.

C. Domain Snapshot Generation

In some embodiments, a new region can be subscribed for a domain. When a new region is subscribed for a domain, a workflow can be initiated by an identity control plane (IDCP) moving a status of the domain-region subscription from "subscribing" to "subscribed." Once the subscription status moved to "subscribed," workloads can run in that region. One of the tasks invoked by the workflow is creating snapshot for the domain in order to bootstrap the domain in the newly subscribed region.

Figure 5:
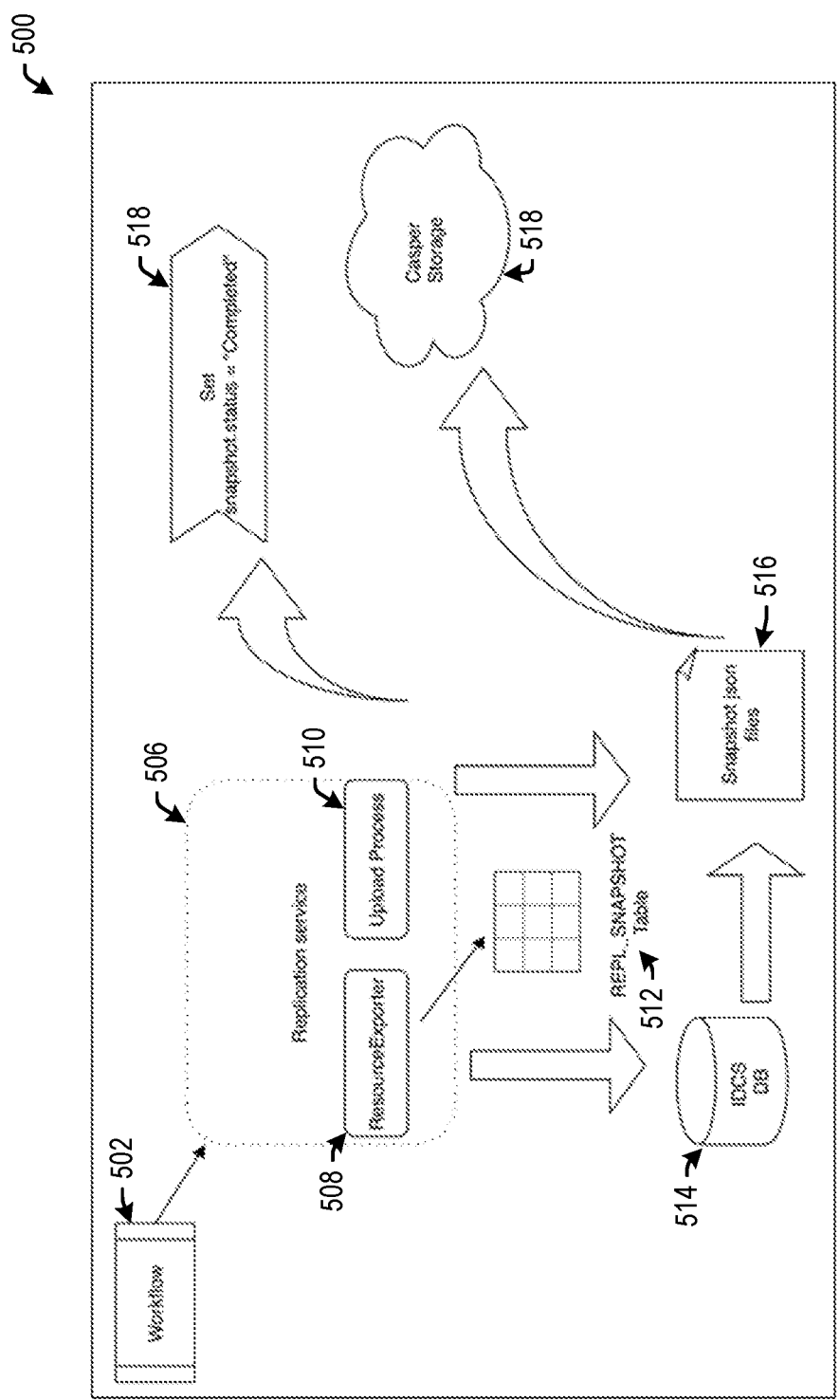
FIG. 5 is a block diagram illustrating an example architecture of domain snapshot generation, according to at least one embodiment.

FIG. 5 is a block diagram 500 illustrating an example architecture of domain snapshot generation. As shown in FIG. 5, when a new region is subscribed for a domain, the workflow 502 can add the region to the domain mapping in a IAM control plane with the status "subscribing." The IAM CP can make an API call to the IDCS to create an on-demand snapshot for that domain. The workflow can invoke stripes with an indicating that the new region is a subscribed region to create an IDCS stripe in the subscribed region.

The domain snapshot can be created by a workflow by invoking an IDCS CP API. The replication service can maintain both a resource exporter 508 and an upload process 510 to update a replication snapshot table with the new regions subscribed for a domain. The data relating to the new regions subscribed for a domain and the replication snapshot table 512 can be stored in a IDCS database 514. Further, such data can be used to create snapshot JSON files (e.g., 516) to be stored in a storage module (e.g., Casper storage 518). After completion of creating the snapshot data, a snapshot status can be set as completed 518.

When a new region is subscribed for a domain, the workflow can add the region to the domain mapping in IAM CP with status "subscribing," which can make an API call to IDCS to create On-demand snapshot for that domain. The workflow can invoke stripes with any required attributes in the payload to create an IDCS stripe in the subscribed region. A domain snapshot can be created by workflow by invoking IDCS CP API. A domain snapshots status can be obtained by performing a call to the IDCS CP API. A snapshot can be generated in a JSON format. Further, a workflow can call for snapshot generation, and can retrieve an input domain name for a replication snapshot table.

A snapshot can be created for all domains in an IDSS shard. For example, when new IDSS shards are built, a snapshot for all domain resources in the shard can be fetched from an IDCS database and database files can be bootstrapped. The IDSS shards can be rebuilt on-demand if a schema changes or a database file is corrupted.

D. Flow Process for Replicating a Domain Across Regions

Figure 6:
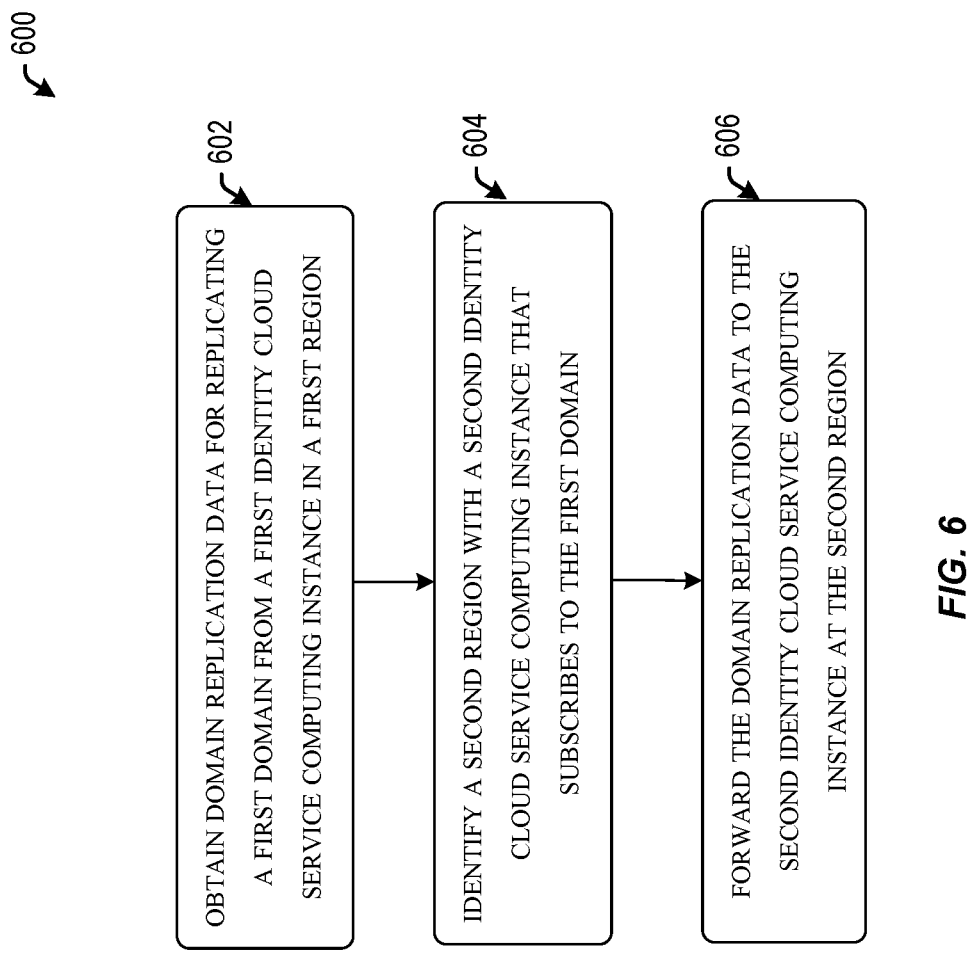
FIG. 6 is a flow diagram illustrating an example process of domain snapshot generation, according to at least one embodiment.

As described herein, the present embodiments relate to replicating domains across regions. FIG. 6 is a flow process of an example method for replicating resources for a domain across multiple identity cloud service regions. A system implementing the embodiments as described herein can include any of a first region, second region, and a multi-region replication service. The first region can include an IDCS instance, an IAM instance, and an IDSS instance. The second region can include an IAM instance and an IDCS instance comprising a replica domain shard replicating a domain in the first region.

At 602, the multi-region replication service can obtain domain replication data for replicating a domain from a first identity cloud service computing instance in a first region. For example, domain replication data can be obtained at a multi-region replication service (e.g., 112) from a domain (e.g., domain 1 104A) in a first region (e.g., IDCS region 1 102A). In some instances, the domain replication data can be obtained first replication shard (e.g., 108A) mapped to the domain. The first region (e.g., region 1 202A) can include both the first identity cloud service computing instance (e.g., IDCS instance 212A) and an identity and access management computing instance (e.g., IAM control plane 206A). In some instances, the method can include retrieving, by the multi-region replication service from the first identity cloud service computing instance via a replication log application programming interface (API), a replication log for the domain, the replication log logging instances of transmission of domain replication data from the domain to other domains subscribing to the domain.

In some instances, the method can include retrieving, by the multi-region replication service from the first identity cloud service computing instance via the replication log API, a domain subscription map for the first identity cloud service computing instance, wherein the second region with the second identity cloud service computing instance is identified as subscribing to the domain by inspecting the domain subscription map.

At 604, the method can include identifying, by the multi-region replication service, a second region with a second identity cloud service computing instance that subscribes to the domain, the second identity cloud service computing instance maintaining a replica domain shard replicating the domain.

At 606, the method can include forwarding, by the multi-region replication service, the domain replication data to the second identity cloud service computing instance at the second region, wherein the second identity cloud service computing instance replicates the domain using the domain replication data.

In some instances, the domain replication data is obtained at an outbox buffer of the multi-region replication service and forwarded from the outbox buffer to an outbox and to an inbox specific to the second identity cloud service computing instance.

In some instances, the domain replication data is forwarded from the first identity cloud service computing instance to an identity shard service at the first region.

In some instances, the domain replication data is stored at a domain cache shard mapping to the domain at the identity shard service.

In some instances, the method can include identifying, by the multi-region replication service, a request to add a third identity cloud service computing instance to subscribe to the domain. The method can also include copying, by the multi-region replication service, the domain replication data for the domain to a catchup outbox at the multi-region replication service for the third region. The method can also include forwarding, by the multi-region replication service, the domain replication data from the catchup outbox to an inbox at the multi-region replication service for the third region, wherein the domain replication data is forwarded from the inbox to the third identity cloud service computing instance to replicate the domain.

E. IaaS Overview

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
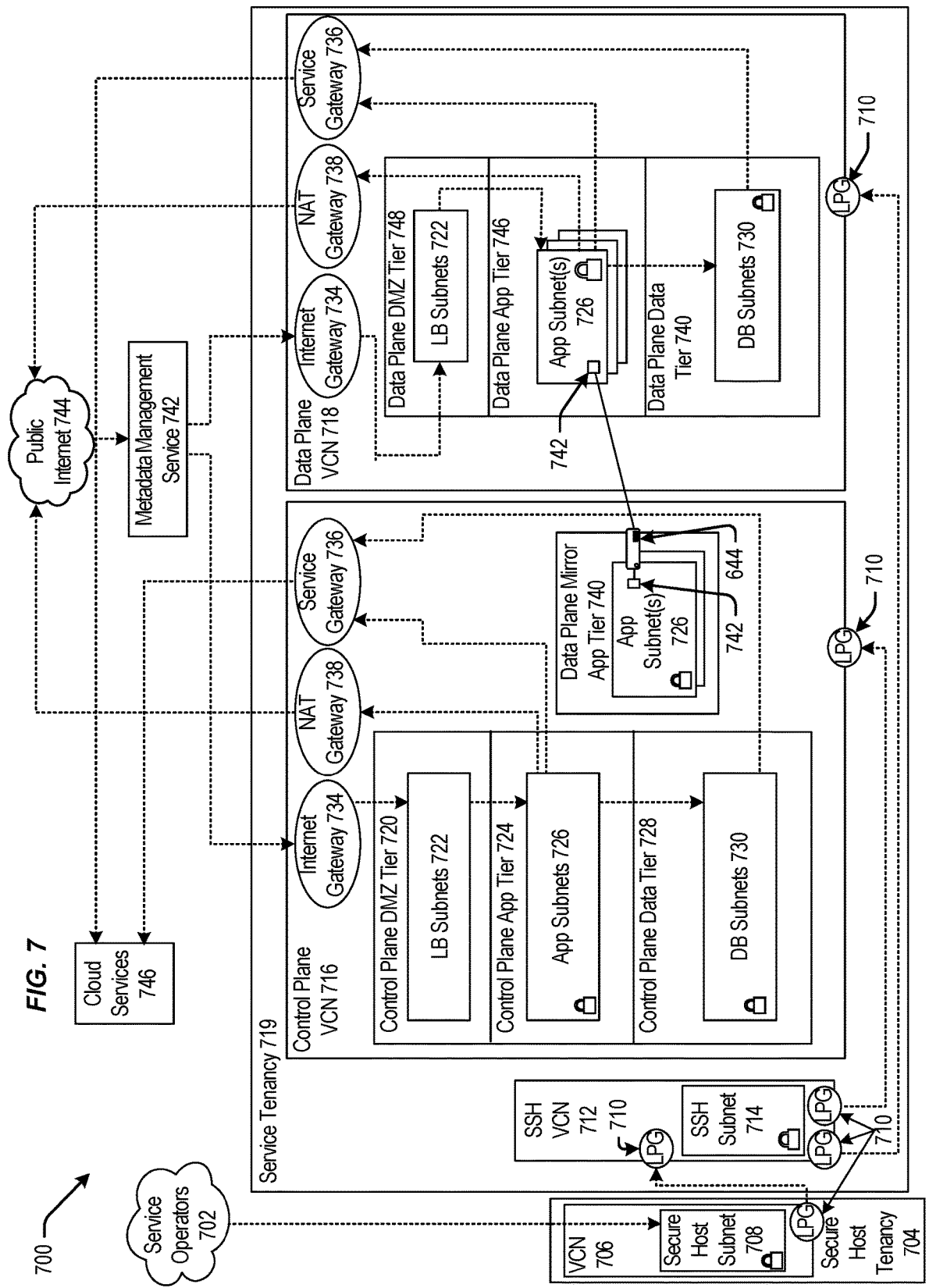
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 9, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Memory that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
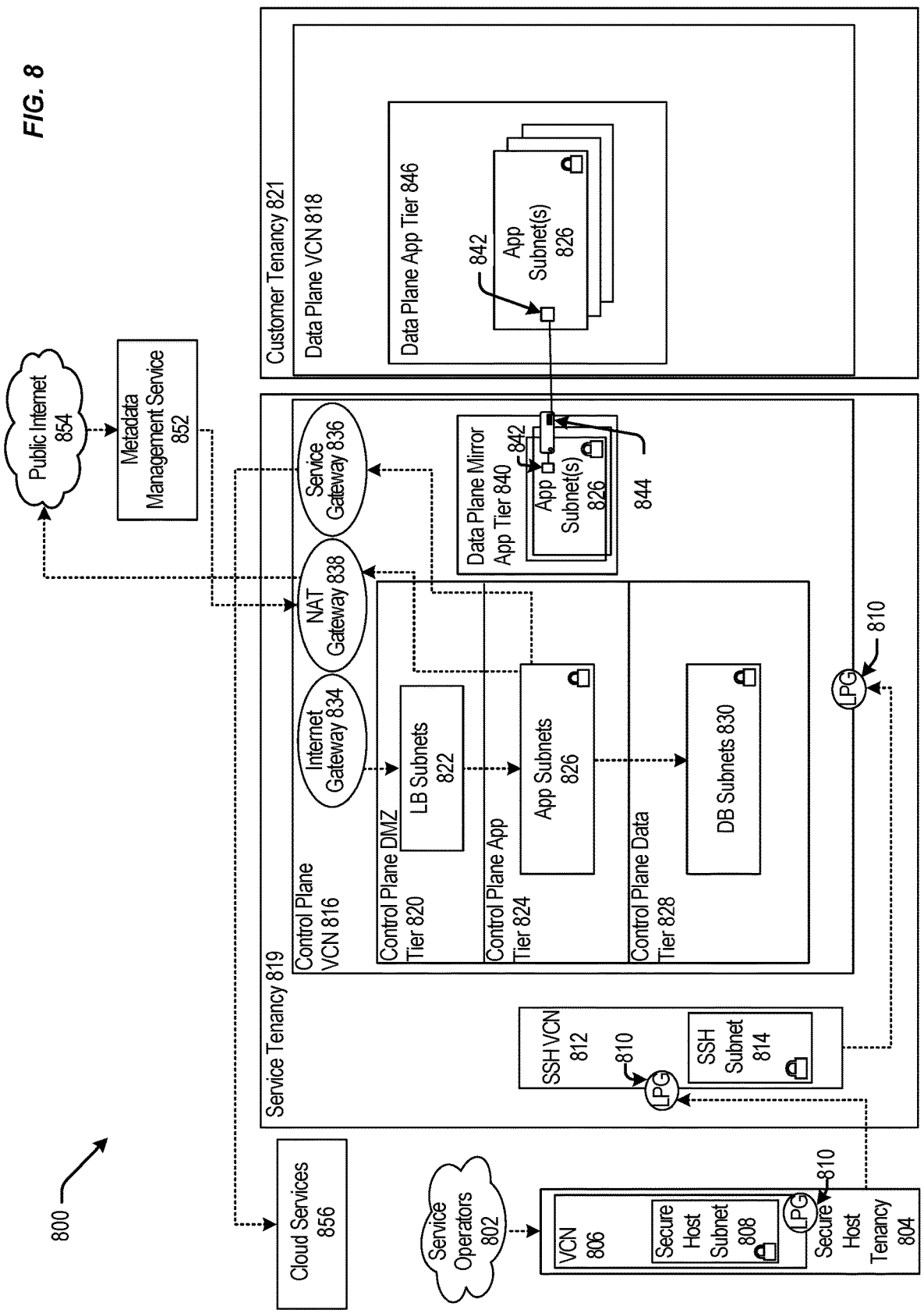
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 702 of FIG. 7) can be communicatively coupled to a secure host tenancy 804 (e.g. the secure host tenancy 704 of FIG. 7) that can include a virtual cloud network (VCN) 806 (e.g. the VCN 706 of FIG. 7) and a secure host subnet 808 (e.g. the secure host subnet 708 of FIG. 7). The VCN 806 can include a local peering gateway (LPG) 810 (e.g. the LPG 710 of FIG. 7) that can be communicatively coupled to a secure shell (SSH) VCN 812 (e.g. the SSH VCN 712 of FIG. 7) via an LPG 710 contained in the SSH VCN 812. The SSH VCN 812 can include an SSH subnet 814 (e.g. the SSH subnet 714 of FIG. 7), and the SSH VCN 812 can be communicatively coupled to a control plane VCN 816 (e.g. the control plane VCN 716 of FIG. 7) via an LPG 810 contained in the control plane VCN 816. The control plane VCN 816 can be contained in a service tenancy 819 (e.g. the service tenancy 719 of FIG. 7), and the data plane VCN 818 (e.g. the data plane VCN 718 of FIG. 7) can be contained in a customer tenancy 821 that may be owned or operated by users, or customers, of the system.

The control plane VCN 816 can include a control plane DMZ tier 820 (e.g. the control plane DMZ tier 720 of FIG. 7) that can include LB subnet(s) 822 (e.g. LB subnet(s) 722 of FIG. 7), a control plane app tier 824 (e.g. the control plane app tier 724 of FIG. 7) that can include app subnet(s) 826 (e.g. app subnet(s) 726 of FIG. 7), a control plane data tier 828 (e.g. the control plane data tier 728 of FIG. 7) that can include database (DB) subnet(s) 830 (e.g. similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g. the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g. the service gateway of FIG. 7) and a network address translation (NAT) gateway 838 (e.g. the NAT gateway 738 of FIG. 7). The control plane VCN 816 can include the service gateway 836 and the NAT gateway 838.

The control plane VCN 816 can include a data plane mirror app tier 840 (e.g. the data plane mirror app tier 740 of FIG. 7) that can include app subnet(s) 826. The app subnet(s) 826 contained in the data plane mirror app tier 840 can include a virtual network interface controller (VNIC) 842 (e.g. the VNIC of 742) that can execute a compute instance 844 (e.g. similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g. the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g. the metadata management service 752 of FIG. 7) that can be communicatively coupled to public Internet 854 (e.g. public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g. cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
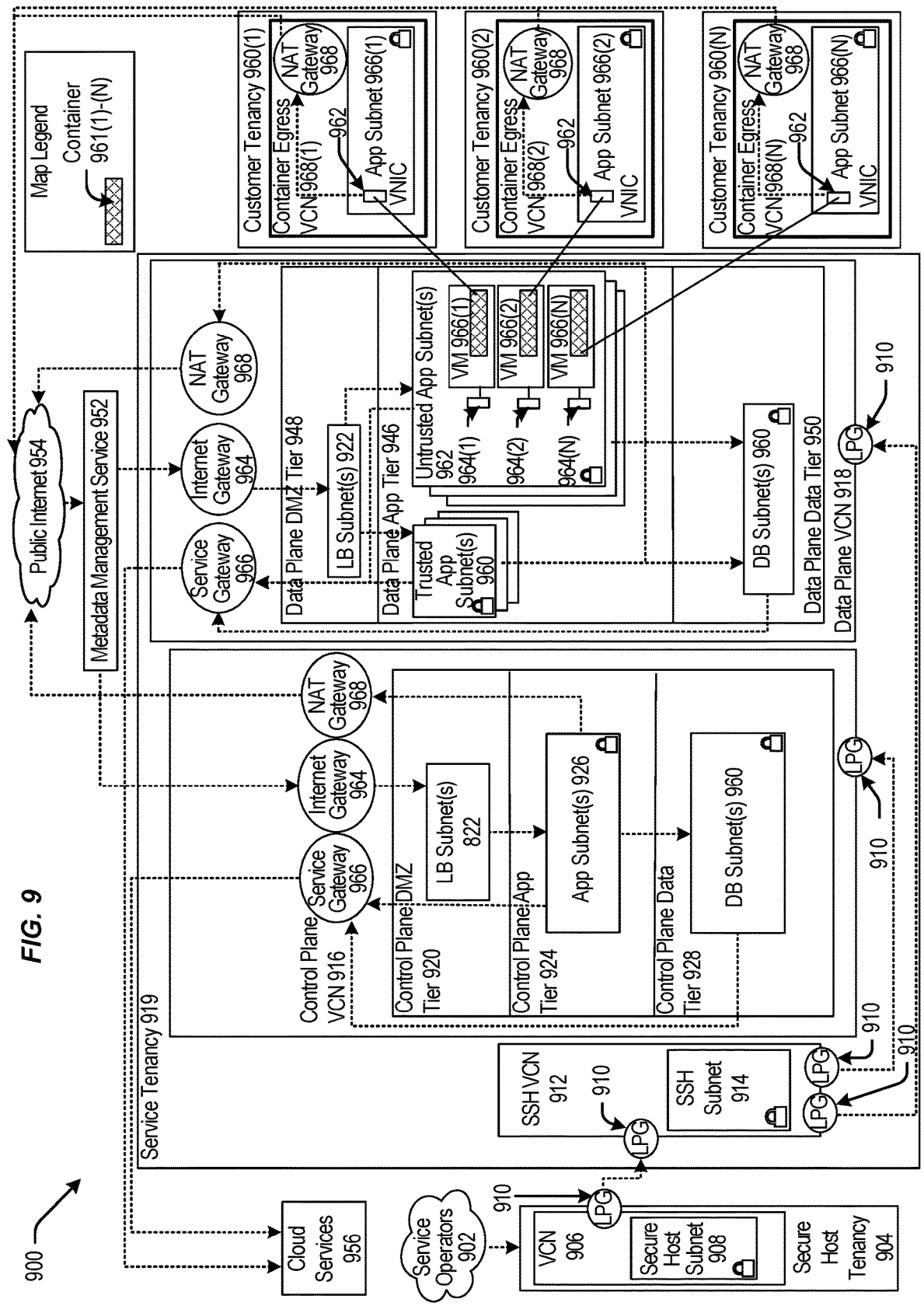
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 702 of FIG. 7) can be communicatively coupled to a secure host tenancy 904 (e.g. the secure host tenancy 704 of FIG. 7) that can include a virtual cloud network (VCN) 906 (e.g. the VCN 706 of FIG. 7) and a secure host subnet 908 (e.g. the secure host subnet 708 of FIG. 7). The VCN 906 can include an LPG 910 (e.g. the LPG 710 of FIG. 7) that can be communicatively coupled to an SSH VCN 912 (e.g. the SSH VCN 712 of FIG. 7) via an LPG 910 contained in the SSH VCN 912. The SSH VCN 912 can include an SSH subnet 914 (e.g. the SSH subnet 714 of FIG. 7), and the SSH VCN 912 can be communicatively coupled to a control plane VCN 916 (e.g. the control plane VCN 716 of FIG. 7) via an LPG 910 contained in the control plane VCN 916 and to a data plane VCN 918 (e.g. the data plane 718 of FIG. 7) via an LPG 910 contained in the data plane VCN 918. The control plane VCN 916 and the data plane VCN 918 can be contained in a service tenancy 919 (e.g. the service tenancy 719 of FIG. 7).

The control plane VCN 916 can include a control plane DMZ tier 920 (e.g. the control plane DMZ tier 720 of FIG. 7) that can include load balancer (LB) subnet(s) 922 (e.g. LB subnet(s) 722 of FIG. 7), a control plane app tier 924 (e.g. the control plane app tier 724 of FIG. 7) that can include app subnet(s) 926 (e.g. similar to app subnet(s) 726 of FIG. 7), a control plane data tier 928 (e.g. the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g. the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 7) and a network address translation (NAT) gateway 938 (e.g. the NAT gateway 738 of FIG. 7). The control plane VCN 916 can include the service gateway 936 and the NAT gateway 938.

The data plane VCN 918 can include a data plane app tier 946 (e.g. the data plane app tier 746 of FIG. 7), a data plane DMZ tier 948 (e.g. the data plane DMZ tier 748 of FIG. 7), and a data plane data tier 950 (e.g. the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g. public Internet 754 of FIG. 7).

The Internet gateway 934 contained in the control plane VCN 916 and contained in the data plane VCN 918 can be communicatively coupled to a metadata management service 952 (e.g. the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
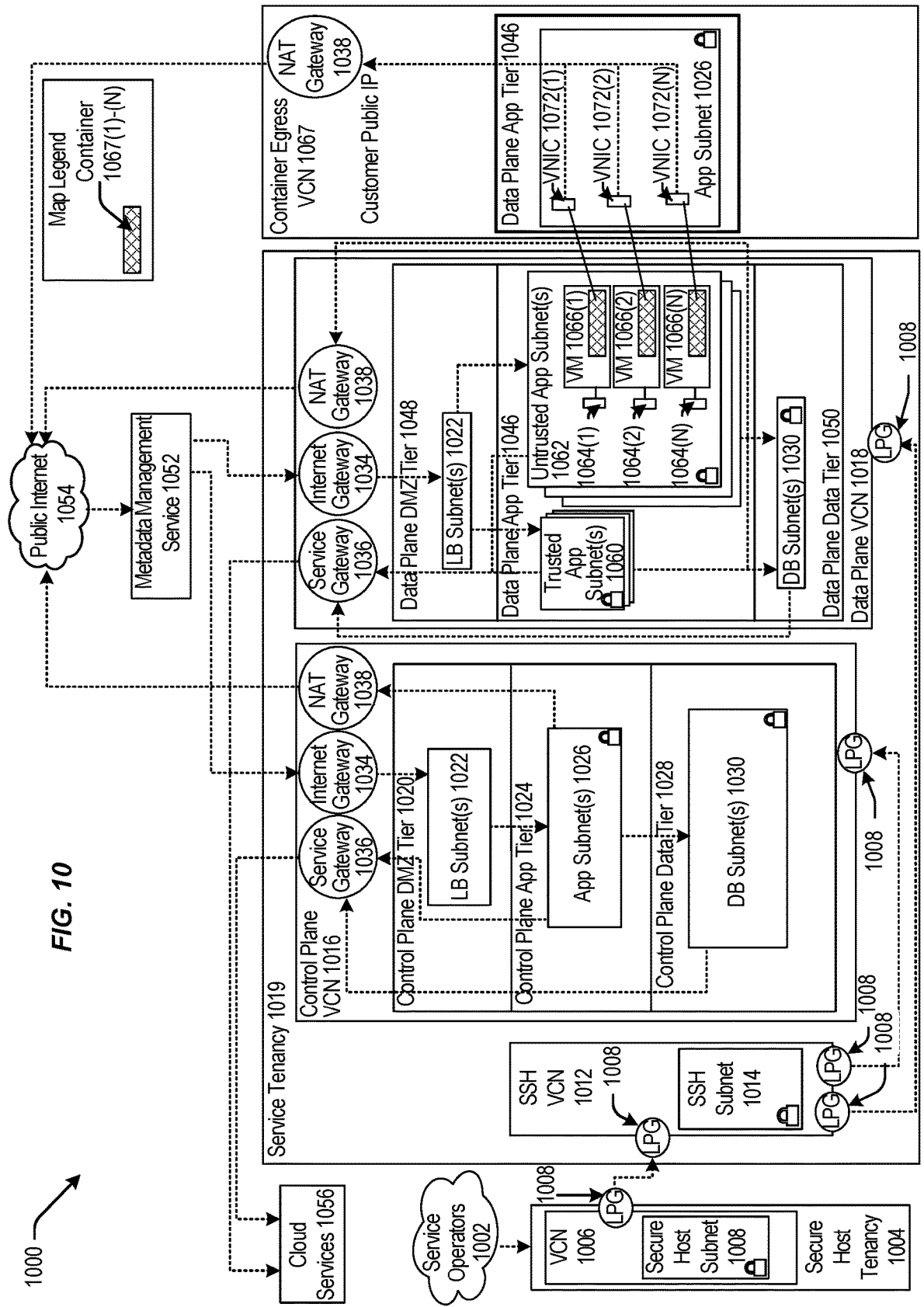
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g. service operators 702 of FIG. 7) can be communicatively coupled to a secure host tenancy 1004 (e.g. the secure host tenancy 704 of FIG. 7) that can include a virtual cloud network (VCN) 1006 (e.g. the VCN 706 of FIG. 7) and a secure host subnet 1008 (e.g. the secure host subnet 708 of FIG. 7). The VCN 1006 can include an LPG 1010 (e.g. the LPG 710 of FIG. 7) that can be communicatively coupled to an SSH VCN 1012 (e.g. the SSH VCN 712 of FIG. 7) via an LPG 1010 contained in the SSH VCN 1012. The SSH VCN 1012 can include an SSH subnet 1014 (e.g. the SSH subnet 714 of FIG. 7), and the SSH VCN 1012 can be communicatively coupled to a control plane VCN 1016 (e.g. the control plane VCN 716 of FIG. 7) via an LPG 1010 contained in the control plane VCN 1016 and to a data plane VCN 1018 (e.g. the data plane 718 of FIG. 7) via an LPG 1010 contained in the data plane VCN 1018. The control plane VCN 1016 and the data plane VCN 1018 can be contained in a service tenancy 1019 (e.g. the service tenancy 719 of FIG. 7).

The control plane VCN 1016 can include a control plane DMZ tier 1020 (e.g. the control plane DMZ tier 720 of FIG. 7) that can include LB subnet(s) 1022 (e.g. LB subnet(s) 722 of FIG. 7), a control plane app tier 1024 (e.g. the control plane app tier 724 of FIG. 7) that can include app subnet(s) 1026 (e.g. app subnet(s) 726 of FIG. 7), a control plane data tier 1028 (e.g. the control plane data tier 728 of FIG. 7) that can include DB subnet(s) 1030 (e.g. DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g. the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g. the service gateway of FIG. 7) and a network address translation (NAT) gateway 1038 (e.g. the NAT gateway 738 of FIG. 7). The control plane VCN 1016 can include the service gateway 1036 and the NAT gateway 1038.

The data plane VCN 1018 can include a data plane app tier 1046 (e.g. the data plane app tier 746 of FIG. 7), a data plane DMZ tier 1048 (e.g. the data plane DMZ tier 748 of FIG. 7), and a data plane data tier 1050 (e.g. the data plane data tier 750 of FIG. 7). The data plane DMZ tier 1048 can include LB subnet(s) 1022 that can be communicatively coupled to trusted app subnet(s) 1060 (e.g. trusted app subnet(s) 960 of FIG. 9) and untrusted app subnet(s) 1062 (e.g. untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g. public Internet 754 of FIG. 7).

The Internet gateway 1034 contained in the control plane VCN 1016 and contained in the data plane VCN 1018 can be communicatively coupled to a metadata management service 1052 (e.g. the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
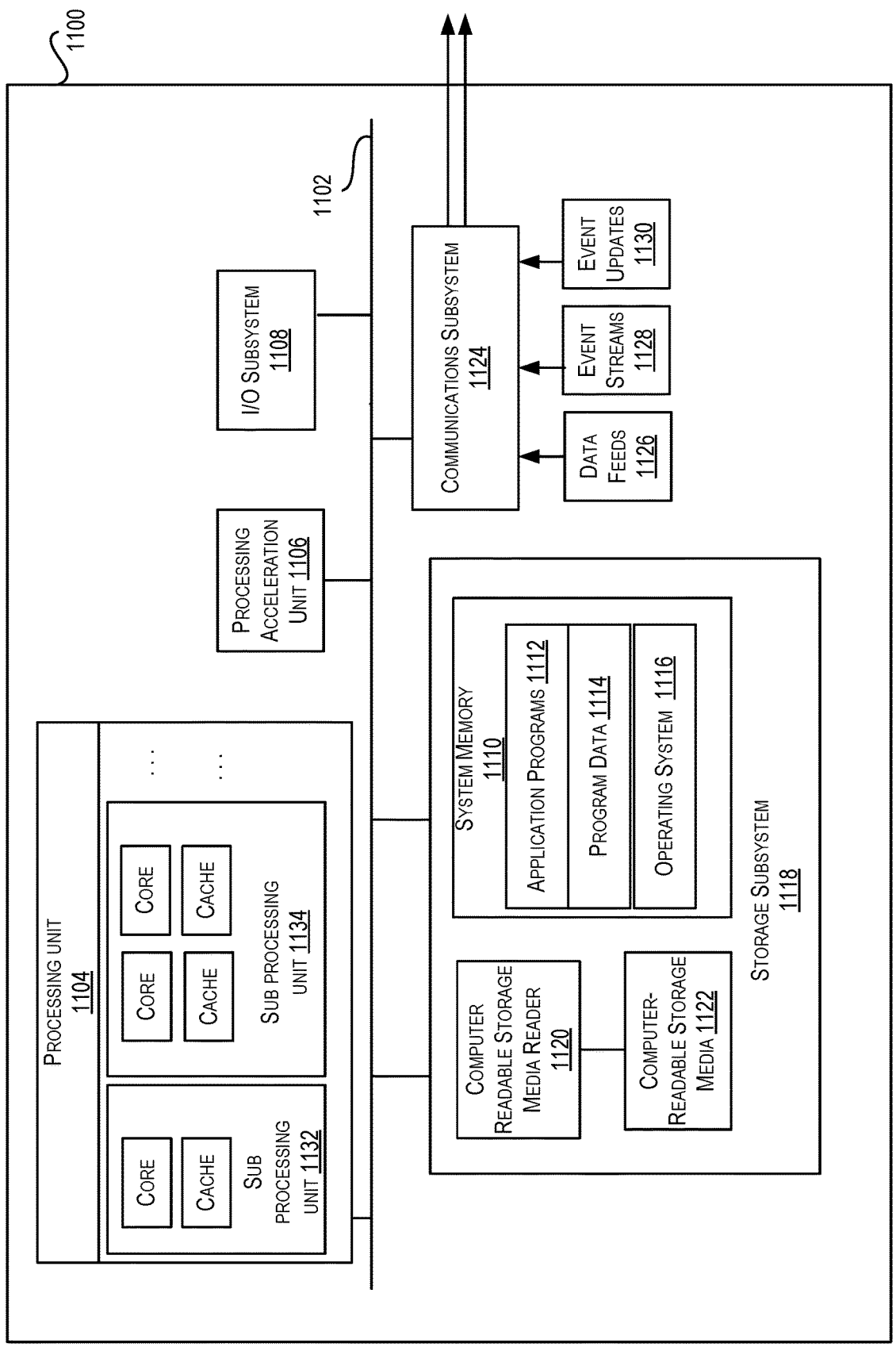
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for replicating resources of a domain across multiple identity cloud service regions, the method comprising:
obtaining, at a multi-region replication service, domain replication data for replicating the resources of the domain from a first identity cloud service computing instance in a first region, the first region comprising both the first identity cloud service computing instance and an identity and access management computing instance;

identifying, by the multi-region replication service, a second region with a second identity cloud service computing instance that subscribes to the domain, the second identity cloud service computing instance maintaining a replica domain shard replicating the domain; and forwarding, by the multi-region replication service, the domain replication data to the second identity cloud service computing instance at the second region, the second identity cloud service computing instance replicating the resources of the domain using the domain replication data.

2. The method of claim 1, wherein the domain replication data is obtained from the first region via a first replication shard mapped to the domain.

3. The method of claim 1, wherein the domain replication data is forwarded from the first identity cloud service computing instance to an identity shard service at the first region.

4. The method of claim 3, wherein the domain replication data is stored at a domain cache shard mapping to the domain at the identity shard service.

5. The method of claim 1, further comprising:

retrieving, by the multi-region replication service from the first identity cloud service computing instance via a replication log application programming interface, a replication log for the domain, the replication log logging instances of transmission of domain replication data from the domain to additional domains subscribing to the domain.

6. The method of claim 5, further comprising:

retrieving, by the multi-region replication service from the first identity cloud service computing instance via the replication log application programming interface, a domain subscription map for the first identity cloud service computing instance, wherein the second region with the second identity cloud service computing instance is identified as subscribing to the domain by inspecting the domain subscription map.

7. The method of claim 1, further comprising:

identifying, by the multi-region replication service, a request to add a third identity cloud service computing instance to subscribe to the domain;

copying, by the multi-region replication service, the domain replication data for the domain to a catchup outbox at the multi-region replication service for a third region; and forwarding, by the multi-region replication service, the domain replication data from the catchup outbox to an inbox at the multi-region replication service for the third region, wherein the domain replication data is forwarded from the inbox to the third identity cloud service computing instance to replicate resources of the domain.

8. The method of claim 1, wherein the domain replication data is obtained at an outbox buffer of the multi-region replication service and forwarded from the outbox buffer to an outbox and to an inbox specific to the second identity cloud service computing instance.

9. A multi-region replication service comprising:

a processor; and a non-transitory computer-readable medium including instructions that, when executed by the processor, configure the processor to:

obtain domain replication data for replicating resources of a domain from a first identity cloud service computing instance in a first region, the first region comprising both the first identity cloud service computing instance and an identity and access management computing instance, the domain replication data being obtained from the first region via a first replication shard mapped to the domain;

identify a second region with a second identity cloud service computing instance that subscribes to the domain, the second identity cloud service computing instance maintaining a replica domain shard replicating the domain; and forward the domain replication data to the second identity cloud service computing instance at the second region, wherein the second identity cloud service computing instance replicates the resources of the domain using the domain replication data.

10. The multi-region replication service of claim 9, wherein the domain comprises an identity and access management entity representing an identity cloud service stripe within the first identity cloud service computing instance.

11. The multi-region replication service of claim 9, wherein the domain replication data is forwarded from the first identity cloud service computing instance to a domain cache shard mapping to the domain at an identity shard service at the first region.

12. The multi-region replication service of claim 9, wherein the instructions further cause the processor to:

retrieve, from the first identity cloud service computing instance via a replication log application programming interface (API), a replication log for the domain, the replication log logging instances of transmission of domain replication data from the domain to additional domains subscribing to the domain.

13. The multi-region replication service of claim 12, wherein the instructions further causes the processor to:

retrieve, from the first identity cloud service computing instance via the replication log application programming interface, a domain subscription map for the first identity cloud service computing instance, wherein the second region with the second identity cloud service computing instance is identified as subscribing to the domain by inspecting the domain subscription map.

14. The multi-region replication service of claim 9, wherein the instructions further cause the processor to:

identify a request to add a third identity cloud service computing instance to subscribe to the domain;

copy the domain replication data for the domain to a catchup outbox at the multi-region replication service for a third region; and forward the domain replication data from the catchup outbox to an inbox at the multi-region replication service for the third region, wherein the domain replication data is forwarded from the inbox to the third identity cloud service computing instance to replicate resources of the domain.

15. A non-transitory computer-readable medium including stored thereon a sequence of instructions which, when executed by a processor causes the processor to execute a process comprising:
- obtaining, at a multi-region replication service, domain replication data for replicating resources of a domain from a first identity cloud service computing instance in a first region, the first region comprising both the first identity cloud service computing instance and an identity and access management computing instance;
- identifying, by the multi-region replication service, a second region with a second identity cloud service computing instance that subscribes to the domain, the second identity cloud service computing instance maintaining a replica domain shard replicating the domain; and
- forwarding, by the multi-region replication service, the domain replication data to the second identity cloud service computing instance at the second region, wherein the second identity cloud service computing instance replicates the resources of the domain using the domain replication data, and wherein the domain replication data is forwarded from the first identity cloud service computing instance to an identity shard service at the first region.

16. The non-transitory computer-readable medium of claim 15, wherein the domain replication data is obtained from the first region via a first replication shard mapped to the domain.

17. The non-transitory computer-readable medium of claim 15, wherein the domain replication data is stored at a domain cache shard mapping to the domain at the identity shard service.

18. The non-transitory computer-readable medium of claim 15, wherein the process further comprises:
- retrieving, from the first identity cloud service computing instance via a replication log application programming interface (API), a replication log for the domain, the replication log logging instances of transmission of domain replication data from the domain to additional domains subscribing to the domain.

19. The non-transitory computer-readable medium of claim 18, wherein the process further comprises:
- retrieving, from the first identity cloud service computing instance via the replication log application programming interface, a domain subscription map for the first identity cloud service computing instance, wherein the second region with the second identity cloud service computing instance is identified as subscribing to the domain by inspecting the domain subscription map.

20. The non-transitory computer-readable medium of claim 15, wherein the process further comprises:
- identifying a request to add a third identity cloud service computing instance to subscribe to the domain;
- copying the domain replication data for the domain to a catchup outbox at the multi-region replication service for a third region; and
- forwarding the domain replication data from the catchup outbox to an inbox at the multi-region replication service for the third region, wherein the domain replication data is forwarded from the inbox to the third identity cloud service computing instance to replicate resources of the domain.

\* \* \* \* \*